May 29, 1934.  W. G. HOWARD  1,960,339
EGG TREATING MACHINE
Filed July 30, 1931  8 Sheets-Sheet 2

Inventor:
Willis G. Howard
By Luther Johns
Att'y.

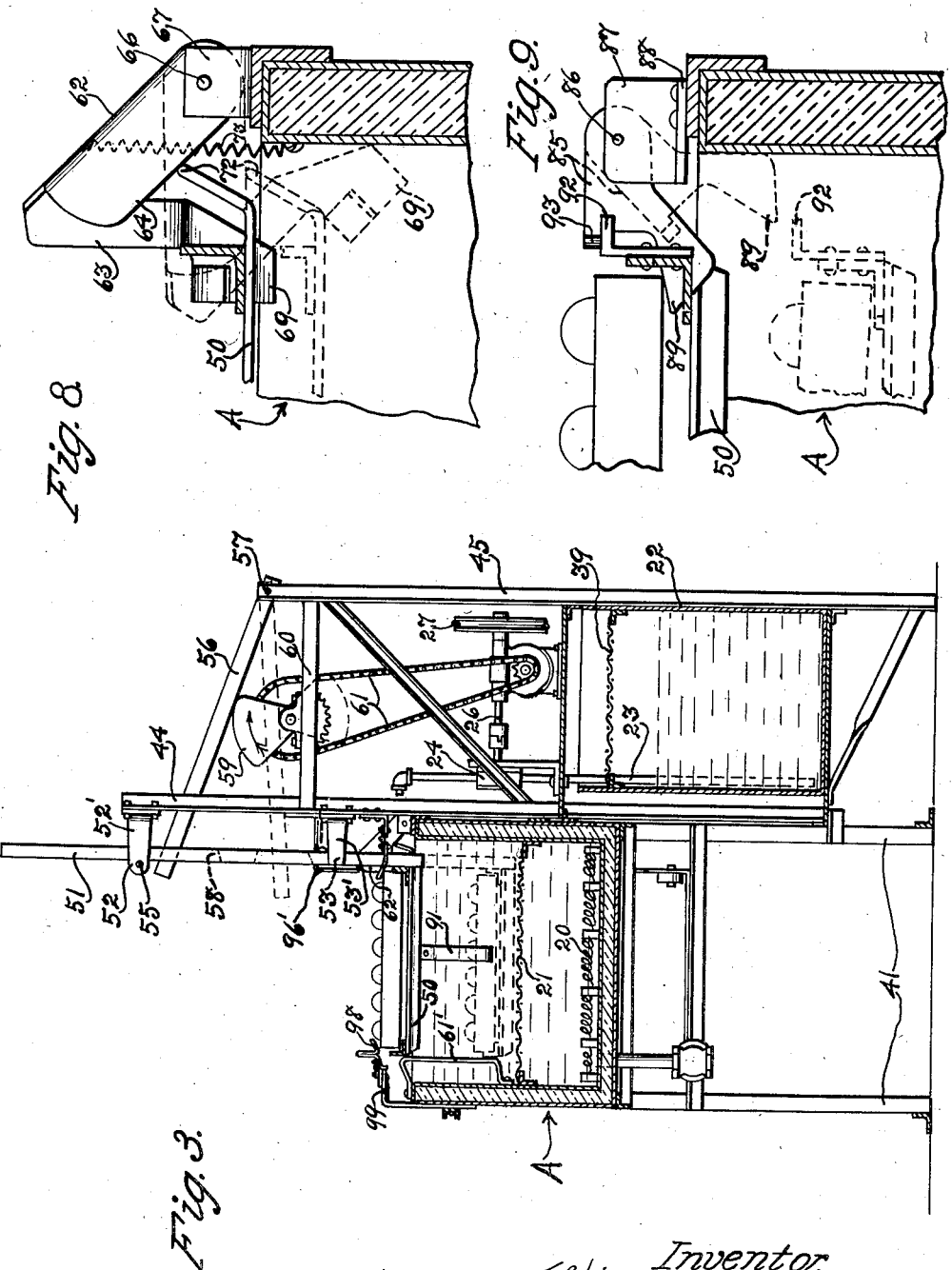

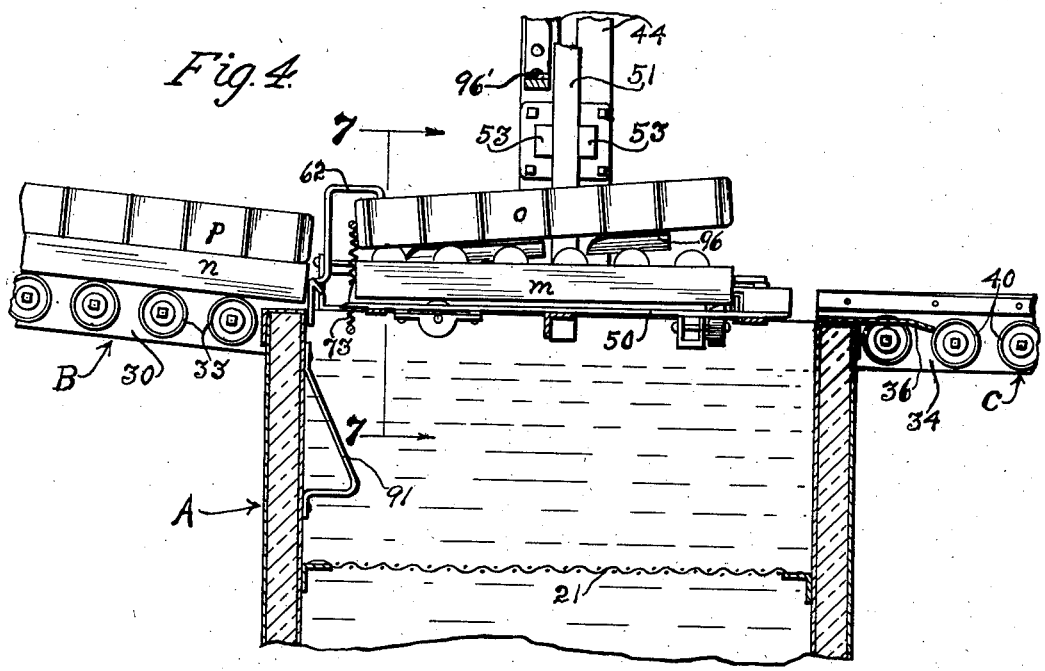
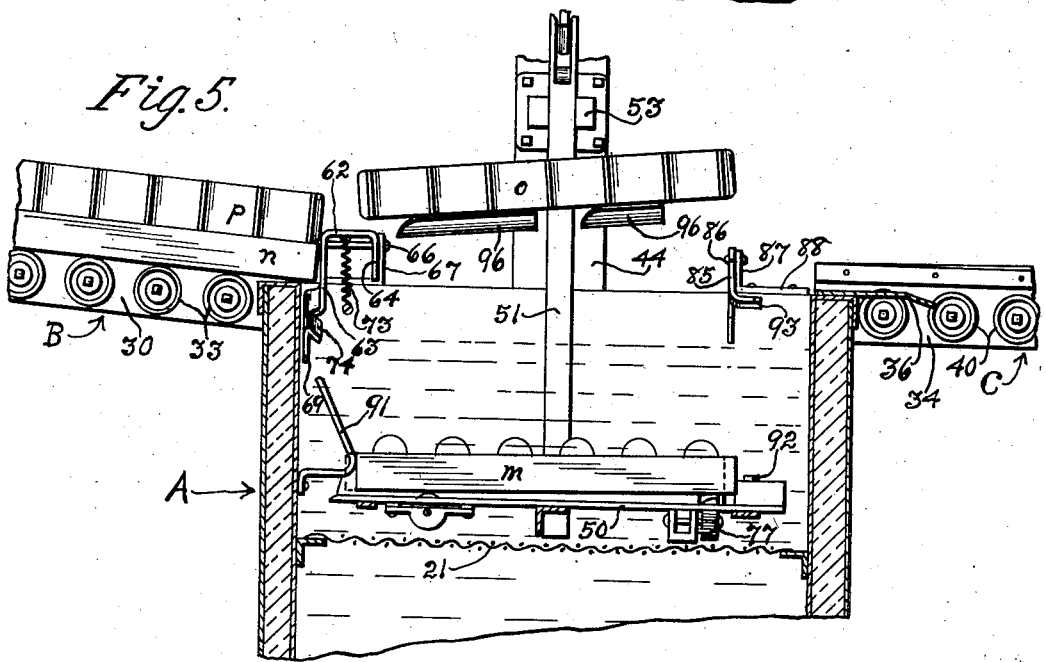

May 29, 1934.  W. G. HOWARD  1,960,339
EGG TREATING MACHINE
Filed July 30, 1931  8 Sheets-Sheet 5
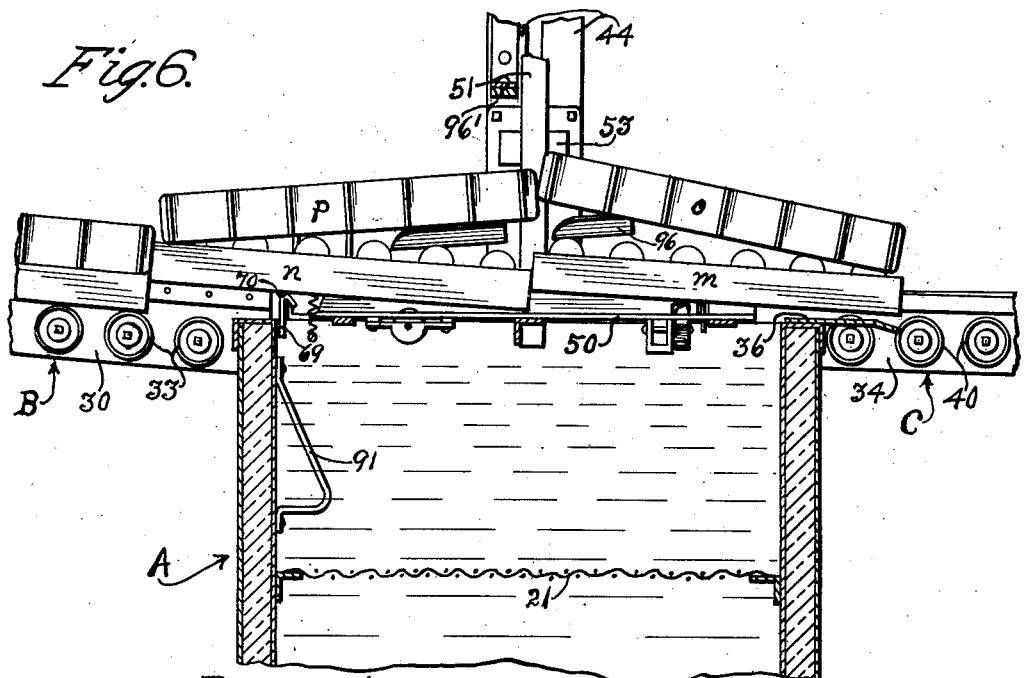
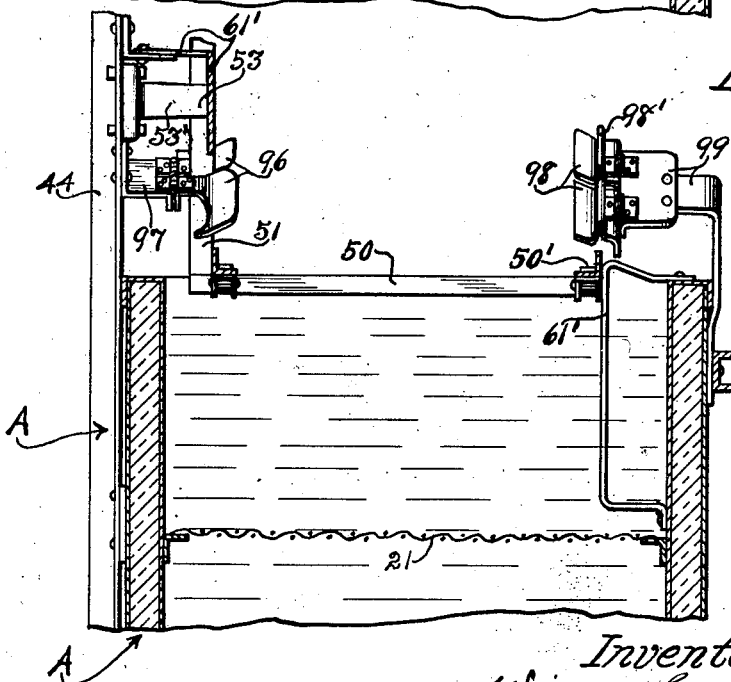

May 29, 1934.  W. G. HOWARD  1,960,339
EGG TREATING MACHINE
Filed July 30, 1931  8 Sheets-Sheet 6

Inventor.
Willis G. Howard
By Luther Johns
Atty.

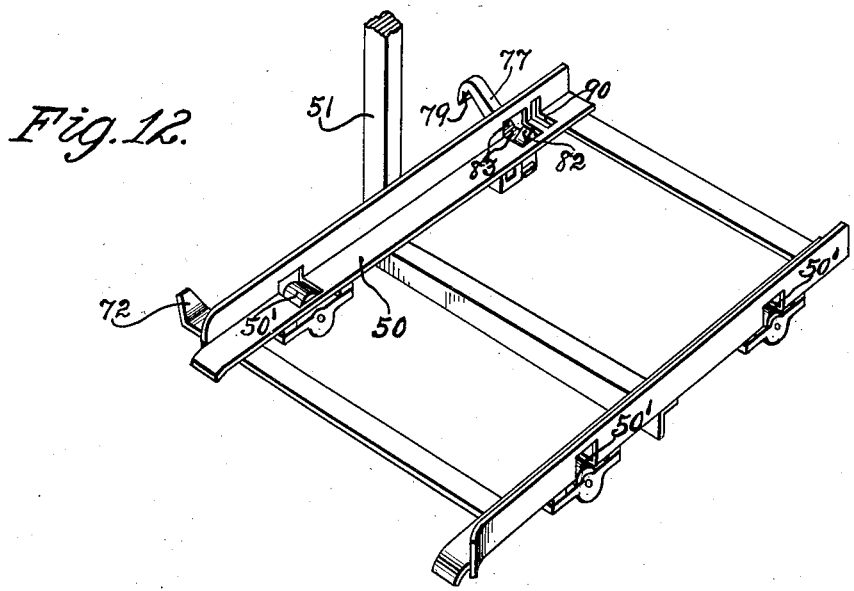
Fig. 12.
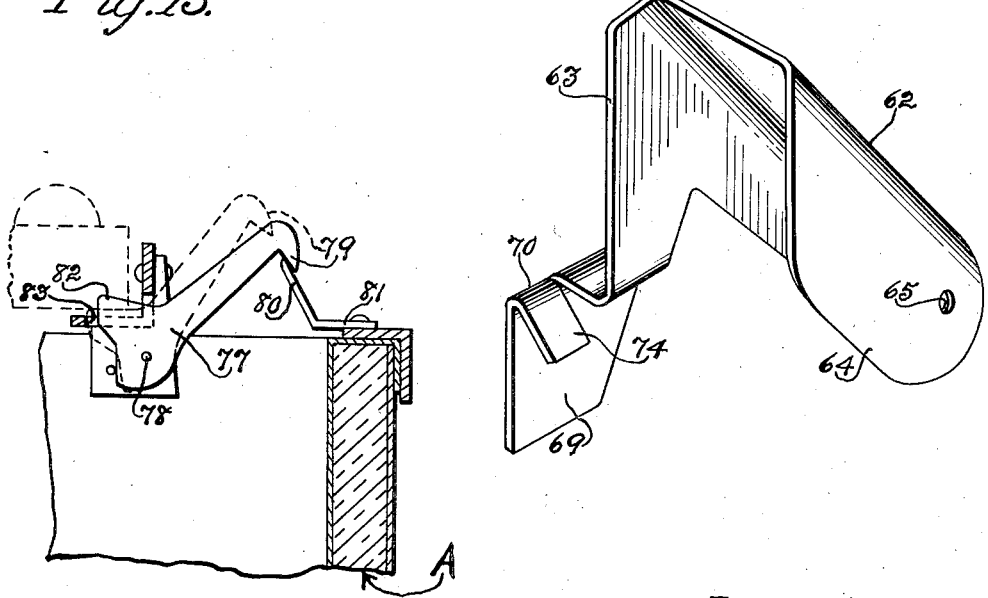
Fig. 13.
Fig. 14.
Inventor.
Willis G. Howard
By Luther Johns
Att'y.

Inventor.
Willis G. Howard
By Luther Johns
Att'y.

Patented May 29, 1934

1,960,339

UNITED STATES PATENT OFFICE 1,960,339

EGG TREATING MACHINE

Willis G. Howard, Indianapolis, Ind., assignor to The Sterolene Co., Indianapolis, Ind., a corporation of Illinois Application July 30, 1931, Serial No. 553,953

18 Claims. (Cl. 99—2)

This invention relates to improvements in egg treating machines.

One of the main objects of this invention is to simplify the egg treating operation and to save operating time and labor. Another object is to provide a more automatically operating machine, especially at the dipping part thereof. Other objects and advantages will appear hereinafter.

In the drawings:

Fig. 3 is a vertical cross-sectional view, taken substantially along line 3—3 of Fig. 2;

Fig. 4 is an enlarged vertical sectional view taken substantially on line 4—4 of Fig. 2, showing the parts in position as the platform with its tray of eggs is ready to descend into the treating chamber;

Figs. 5 and 6 are views similar to Fig. 4, but showing the various parts arranged respectively, while the platform with the tray of eggs is at the lowermost position in the chamber, and while a tray of eggs is moving onto the platform and is pushing the preceding tray off of the platform;

Fig. 7 is a vertical cross-sectional view, taken substantially along line 7—7 of Fig. 4, omitting the tray and the filler;

Figure 2:
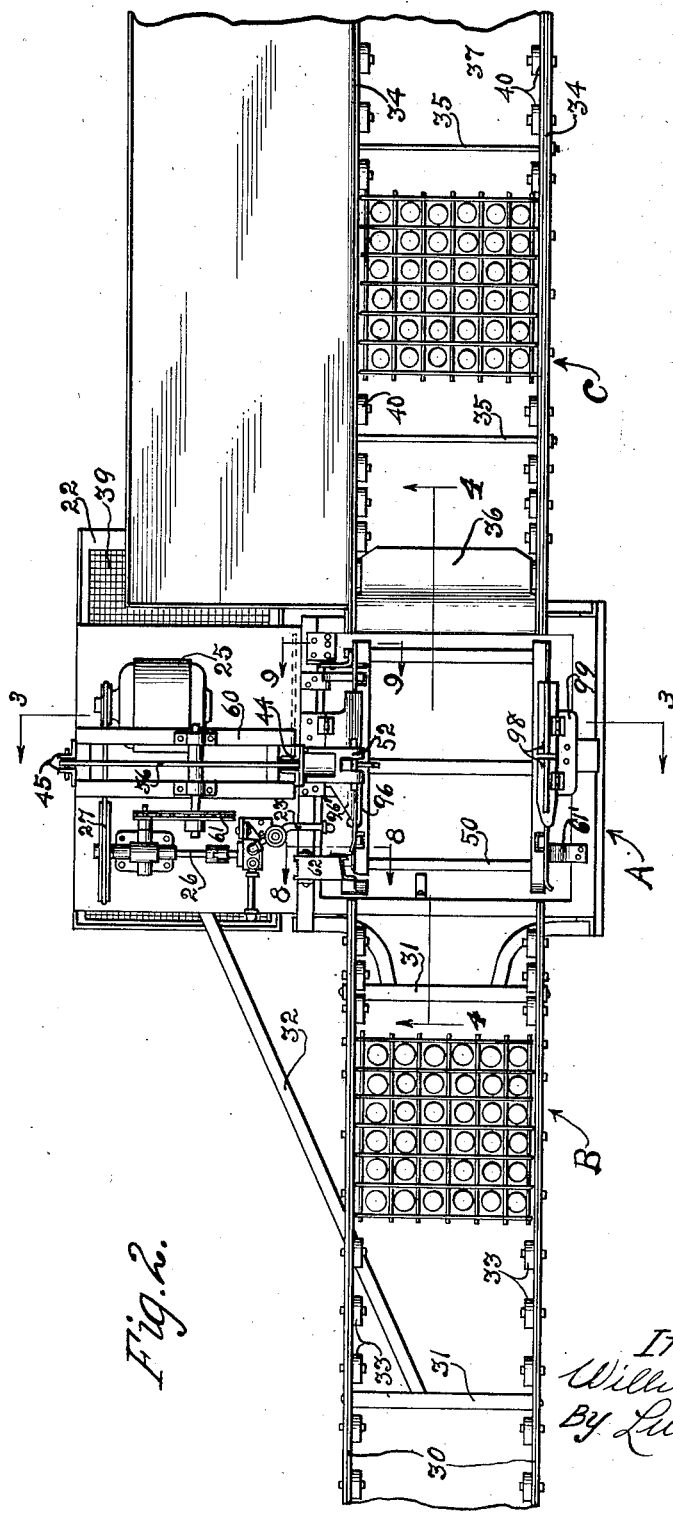
Fig. 2 is a top plan view of the mechanism shown in Fig. 1.
Figure 10:
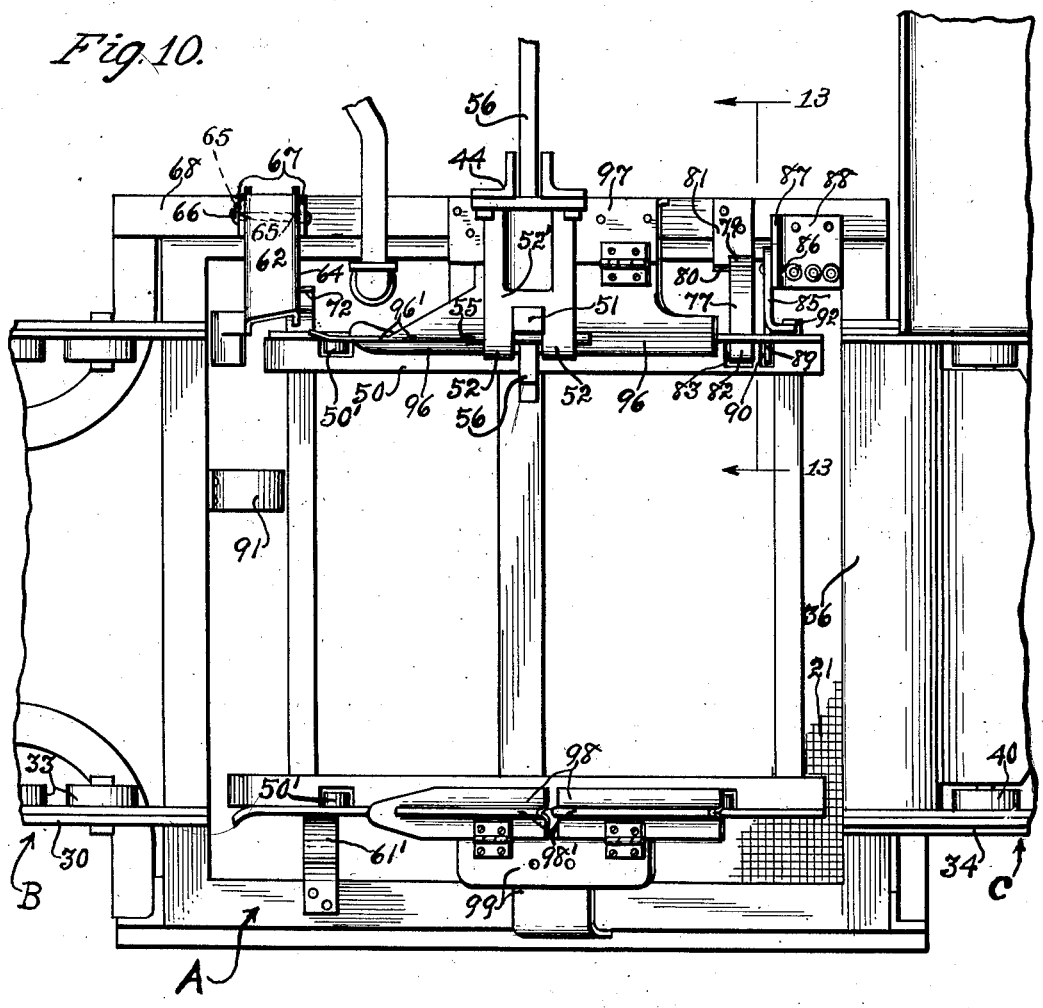
Figure 11:
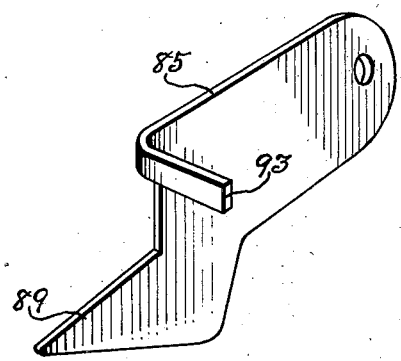
Figure 15:
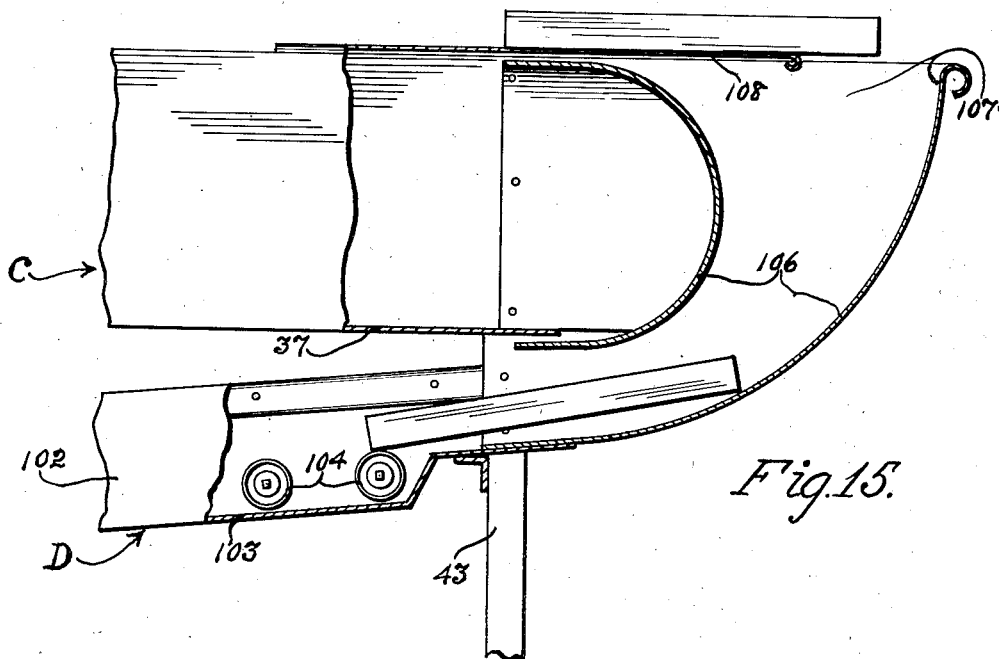
Figure 16:
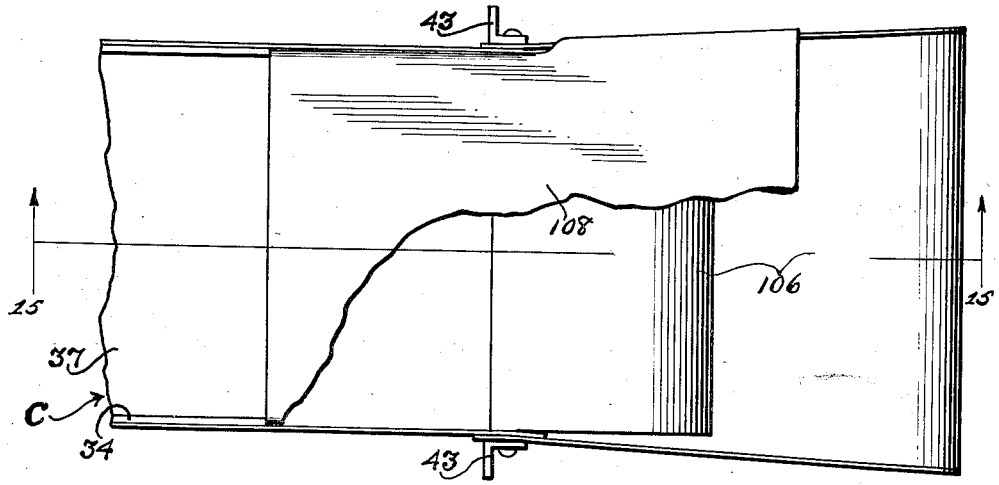

Figs. 8 and 9 are enlarged cross-sectional views, taken respectively on lines 8—8 and 9—9 of Fig. 2;

Fig. 10 is a top plan view of the egg treating chamber and associated parts;

Fig. 11 is a perspective view of the tray lifting and stopping latch mounted at the discharge end of the egg treating chamber;

Fig. 12 is a perspective view of the reciprocating platform;

Fig. 13 is an enlarged vertical cross-sectional view, taken substantially on line 13—13 of Fig. 10;

Fig. 14 is a perspective view of the tray lifting and stopping member mounted at the receiving end of the egg treating chamber;

Fig. 15 is a vertical sectional view, taken substantially along line 15—15 of Fig. 16; and Fig. 16 is a top plan view of the tray receiving and returning portion at the unloading end of the machine.

The drawings show an egg treating machine comprising a main treating chamber or tank A containing liquid for treating the eggs; a feeding conveyor B for conducting trays of eggs to said chamber; and a discharge conveyor C for conducting trays of eggs from said chamber to the unloading end of the machine (see Fig. 15).

Chamber A may be according to ordinary and well known construction. It is provided with any appropriate heating means, as the wire coils 20, in its lower portion, for heating the treating liquid, and has a transverse screen 21 above said heating means designed to catch, for easy recovery, any spillings of eggs that may occur.

A reservoir or supply tank 22 is connected with chamber A by means of a conduit 23 having a pump 24 interposed therein and actuated by motor 25 through driving means 26 and 27 for supplying oil from the reservoir to the chamber.

Figure 1:
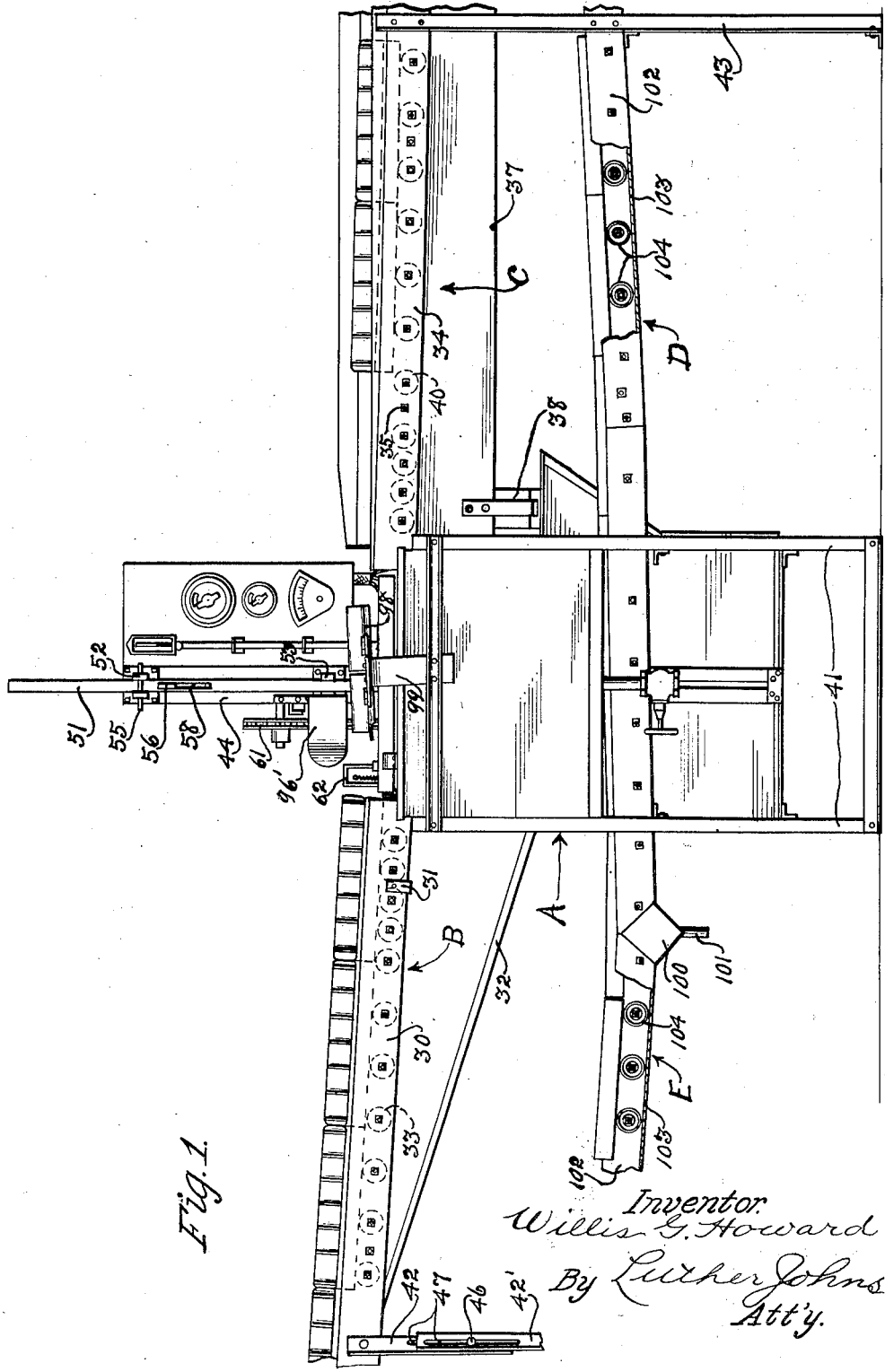
Fig. 1 is a side elevational view of an egg treating machine embodying my present improvements, the loading and unloading or delivery portions being broken away.

The feeding conveyor B comprises side bars 30 secured together by cross-bars 31, and a brace bar 32 (see Fig. 1) extends from said conveyor downwardly and laterally to the reservoir. Rotary elements 33 in the form of rollers or wheels are provided on the inward sides of the side bars 30 and are preferably mounted thereon by the use of antifriction bearing means. This conveyor B is positioned at a downward slant or angle in the direction of tray travel in such a manner that the several trays with eggs therein will move downward toward the treating chamber A while rotating the wheels or rollers 33. In my practice four trays are on the downwardly-inclined conveyor B at any given time. They move easily over the conveyor by force of gravity and automatically move forwardly with the proper speed and force to advance the trays of eggs onto the treating mechanism and therefrom onto the discharge conveyor.

The discharge conveyor C comprises side bars 34 secured together by cross rods 35. An apron 36 (see Fig. 2) extends over the discharge edge of the chamber into the discharge conveyor. A trough or channel member 37 is provided under this conveyor and slants downwardly in the direction toward chamber A. A transversely-extending trough or drain member 38 extends from under the lower inner end of channel 37 over to reservoir 22, so as to collect the liquid that may drip from the trays in passing over this conveyor portion and return it to the reservoir. A protecting screen 39 is provided adjacent to the top of reservoir 22. Rotary members, wheels or rollers 40 are provided on the inner sides of bars 34, being preferably mounted thereon by the use of suitable anti-friction bearing means. This discharge conveyor C slants downward in the forward direction of travel, or the direction away from chamber A. This provided that the trays of treated eggs will move at the proper speed away from said chamber.

The supporting frame for the machine preferably consists of angle iron members, including leg members 41 provided under chamber A, and leg members 42 and 43 provided under the conveyors B and C. Supporting members 44 and 45 are provided on the opposite sides of the reservoir 22, and extend upwardly therefrom to support suitable bracket means for the motor and the operating mechanism.

The legs 42 are preferably made adjustable for length, for example, by providing the leg with a lower part 42' adjustably attached to the upper part thereof, as by overlapping said parts and extending a bolt 46 through slot means 47 provided in said overlapping parts. This serves for properly adjusting the inclination of the tray-conveying part B in order automatically to convey the trays of eggs at the proper or desired speed over the conveying means and through the entire machine. It is here pointed out that the gravitational force of the advancing series of trays is used to move a given tray off of the dipping platform and also to initiate forward movement of trays beyond the dipping station should such trays become quiescent. By making the slant of the advancing trays adjustable I am able to control the application of tray-moving force as desired.

The means for dipping the trays of eggs in the chamber comprise a carrier or elevator, in the shape of a platform 50 (see Fig. 12) having an upright bar or post 51 thereon which is guided between the pairs of upper and lower spaced or forked fingers 52 and 53 of guide members 52' and 53' respectively, which are secured to the supporting member 44. A readily removable pin 55 is mounted in the outer end of spaced fingers 52, for slidably retaining said bar, and to enable the post 51 to be removed therefrom. A lever or operating bar 56 is pivotally mounted by a pin 57 at the upper end of the supporting means 45, and its free end is movably positioned in an elongated slot 58 provided in post 51, so that said lever will raise said post and platform, and the post can be readily withdrawn from said lever when the post is removed from the spaced fingers, in removing the platform. This construction provides that by the mere withdrawal of pin 55 the bar 51 can be freely slid outwardly and removed from between both pairs of spaced fingers and the platform can be readily removed for cleaning purposes, etc. Suitable rollers 50' (see Fig. 12) are provided on the platform to facilitate the movement of the trays thereon.

The lever and platform are operated by means of a segmental cam 59 swingably mounted on bracket means 60 provided between the supporting members 44 and 45 and said cam is actuated by a chain 61 driven by motor 25. The cam engages freely under lever 56 so that the platform may remain in its raised position while the cam rotates, until a tray of eggs is properly seated on the platform. A guide bar or rail 61' extends vertically upwardly along the wall of the chamber to engage the free end of the platform opposite post 51, and guide it during its reciprocation.

Means are provided for limiting or stopping the movement of the egg trays in their travel on the feeding conveyor, immediately adjacent to the treating chamber, (see Fig. 4) and these means comprise a limiting and lifting member or latch 62 (see Fig. 14) which is substantially yoke shaped having depending flanges 63 and 64 thereon, the flanges 63 and 64 being provided with openings 65 therein for receiving a pivot pin 66 (see Figs. 4, 10 and 14) mounted in bracket lugs 67 provided on a supporting member or frame member 68 on the side of the chamber. This member 62 has a lower flange or ear 69, provided at the lower end of flange 63, and is slightly offset therefrom, thereby providing a lifting shoulder 70. Said flange 69, is normally positioned in the chamber (see Figs. 4 and 6) and initially limits the movement of and stops the nearest approaching egg tray as its inner end reaches the inner side of the wall of said chamber. This stop element 69 thus acts initially as a stop for the nearest approaching tray $n$ while the platform is at its elevated or uppermost position.

Means are provided on the platform to co-operate with said latch member 62, and these preferably comprise a finger or lug 72 on the side of the platform which engages flange 64 and holds member 62 normally in its elevated position while the platform is in its uppermost position, and when the platform descends this latch member 62 is moved downwardly through the action of a spring 73 aided by gravity, so that shoulder 70 is moved below the top of the chamber, and the approaching tray $n$ moves forwardly against stop flange 63 (see Fig. 5).

A deflecting flange 74 is extended slantingly inwardly from flange 69, at shoulder 70, so as to ease the slight drop or descent of the tray with the eggs, from the conveyor, over said shoulder 70, onto the platform.

Means are provided for holding or securing the carrier or platform 50 in its elevated position until a tray of eggs is normally moved thereon, (see Figs. 10, 12 and 13) and these preferably include a latch 77 pivotally mounted on the platform by a pin or pivot element 78. A lip 79 on the upper end of this latch engages over an upstanding arm 80 of a bracket plate 81 secured upon member 68 on the wall of the chamber. This latch has a foot 82 which swings upwardly into a slot 83 in the platform, and when the tray of eggs is moved onto the platform such tray bears upon and depresses this foot, thereby releasing lip 79 from arm 80 to release the latch, as shown by the broken lines in Fig. 13, thereby enabling the platform with the tray of eggs to descend into the treating liquid in the chamber. This type of holding latch 77 is more fully disclosed and claimed in the application of Burdette E. Ford, for Egg treating machines, Serial Number 512,571, filed January 31, 1931 (patented July 14, 1931 as No. 1,814,680). Said latch positively holds the platform in its elevated position until a tray of eggs is fully positioned thereon, and prevents any descending of the platform while empty.

Means are provided for limiting the forward movement of the egg tray onto the platform and to position it properly thereon, and these means preferably include a stopping and lifting member or latch 85 (Fig. 11) which is pivotally mounted by a pin 86 (Fig. 5) on the upstanding flange 87 of a bracket plate 88 (Fig. 10) secured on the wall of the chamber adjacent to bracket plate 81. A stopping and lifting toe 89 on this latch 85 extends inwardly and upwardly through a slot 90 (Fig. 12) on the platform, while the latter is in its elevated or tray-receiving position, and as the tray of eggs is moved onto the platform this toe acts as stop means for limiting the forward travel of the tray and is thus effective in positioning the tray on the platform (see Fig. 4).

As the platform with its tray of eggs thereupon descends into the chamber, upon the release of holding latch 77, the tray is engaged by a shifting member 91, (Figs. 4 and 5) which is provided in the form of a strap slanting from near the top of the chamber downwardly and inwardly for the greater distance of the descent of the tray, so as to shift or offset the tray a given distance relative to the platform. During this descent the latch 85 has dropped by gravity, as indicated in Figs. 5 and 9, the toe 89 being thereby out of the slot 90 on the platform; and as the platform and tray again reach their uppermost position a lug 92 on the platform engages under a finger 93 extending laterally from latch 85 (see Figs. 9, 10 and 11) and thereby swings this latch upward and moves its toe 89 through slot 90 and engages the lower edge of the tray $m$ slightly lifting the forward end thereof (see Figs. 6 and 9); thereby permitting the fore end of latch 77 to descend into its holding position, as indicated in Fig. 13, to hold the platform positively in its elevated position (see Figs. 6 and 13), until the next tray $n$ is wholly on the platform.

In the meantime, the succeeding tray $n$ (see Figs. 5 and 6) has been in engagement with stop flange 63 of latch 62, and when the platform has neared its uppermost position lug 72 has engaged finger 64 on said latch 62 and has lifted the tray $n$ by the engagement of shoulder 70 beneath the front edge of said tray, thereby enabling the tray to pass over said shoulder as soon as the stop flange 63 has been moved out of the path of the tray, as said latch with its flanges is at its uppermost position. Thereafter the tray $n$ is free to move onto the platform and to force the preceding tray $m$ forwardly from the platform onto the discharge conveyor, as indicated in Fig. 6.

Means are provided for supporting the egg fillers above the chamber, while the tray with eggs is being reciprocated in the chamber and dipped in the liquid. This filler supporting means preferably comprises a pair of supporting members or plates 96 (see Figs. 4 to 7, and 10) extending inwardly above one side of the platform and being hingedly mounted on bracket means 97 (Fig. 10) extending from supporting member 44; also a pair of similar supporting members or plates 98 extending inwardly above the opposite side of the platform and being hingedly mounted on bracket means 99 (Fig. 10) arising from the wall of the chamber. A guide plate 96' extends from member 44 inwardly above one of the members 96, and guide ribs 98' arise from members 98, to prevent lateral movement of the fillers on said supporting members 96 and 98. As the tray of eggs with the filler thereon is raised at the forward part, by means of lifting shoulder 70, the filler is automatically placed in position to slide readily onto the supporting members 96 and 98, and the filler is thereupon automatically lifted from its tray of eggs and slid onto these supporting members, while the tray of eggs passes onto the platform (see Fig. 6). During this time the approaching filler $p$, in passing onto these supporting members, automatically pushes the preceding filler $o$ off the forward ends thereof; and in the meantime the approaching tray $n$ pushes the preceding tray $m$ off of the platform. By this arrangement the forward filler $o$ automatically drops and nestles onto the dipped eggs in the forward tray $m$; whereby the tray with eggs and the filler thereon are automatically united, and will again travel together, over the discharge part C of the conveyor.

Conveying means are provided for returning the empty trays from the discharge or unloading end of the machine to the receiving or loading end thereof. This conveying means is substantially trough-like in structure and is positioned below the conveying means B and C and below the chamber A, and it includes a main section D which extends downwardly slightly from the discharge end of the machine, through underneath said chamber, to a point therebeyond, where a drain channel 100 is provided, having a drain pipe 101 depending therefrom, for directing the drained liquid into any suitable receptacle. The portion E, of the conveyor extends at a slight slant upwardly from said channel 100 to the receiving or loading end of the machine. These portions D and E of this conveyor include side bars or members 102 connected by a bottom plate 103, thereby forming a drain channel for the return of any treating from the trays to a suitable receptacle placeable under pipe 101. Rollers or rotary elements 104 are provided in these conveying portions and are preferably mounted by anti-friction bearing means on the side bars 102. The slant or inclination of these conveyor portions with the rollers therein is at such a pitch, and the junction of said portions, at the channel means 100, is positioned a certain distance beyond the chamber A, that is, to the left-hand side of the chamber, as viewed in Fig. 1, so that the majority of the empty trays are descending on the longer portion D, while the smaller numbers of empty trays are ascending on the shorter portion E of the conveyor; and this construction and arrangement of the various parts, including the anti-friction rollers, and the slant or pitch of the conveyor portions, is all so arranged that the descending trays will substantially automatically move forwardly the entire line of trays from the discharge end to the receiving end of the machine. This type of trough-like structure for the return of the empty trays is similar to and is an improvement over that disclosed and claimed in the patent of Burdette E. Ford, No. 1,814,680, July 14, 1931, for Egg treating machine.

At the discharge or unloading end of the machine (see Figs. 15 and 16) a return channel or chute 106 is provided, which forms a connection between the upper conveyor C and the return portion D. This chute is substantially funnel-shaped, having a broad mouth 107 at its upper end for readily receiving therein the empty egg trays from the top plate or platform 108 on the conveyor C; and the chute is contracted and curved downwardly toward the conveyor portion D, as best shown in Fig. 15, in such a manner as to place the trays properly upon the rollers 104 and to start them in their return travel in this descending portion D of the conveyor. This form of chute or return channel thus facilitates the convenient entry therein and the movement therethrough of the empty trays from the conveyor C to the conveyor portion D for the return of the trays from the discharge end to the receiving end of the machine.

It is to be understood that ahead of chute 106 the treated eggs and fillers have been removed from the trays.

I contemplate as being included in these improvements all such changes, variations or departures from what is thus specifically illustrated and described as fall within the scope of the appended claims.

I claim:

1. In an egg treating machine including a treating chamber having means for reciprocating a tray of eggs therein and means for conducting trays of eggs thereto, the combination therewith of means for stopping the movement of an approaching tray of eggs on said conducting means until said reciprocating means is in its tray-receiving position, and means synchronized with a movement of said reciprocating means for moving said stopping means out of the path of travel of said approaching tray.

2. In an egg treating machine having an egg treating chamber and means for conducting trays of eggs thereto, the combination therewith of a reciprocating platform for dipping a tray of eggs in said chamber, movable means normally positioned for automatically stopping the movement of the succeeding tray of eggs on said conducting means adjacent to said chamber until said platform is in position to receive it, and means on said platform for moving said stopping means out of the path of said succeeding tray when the platform reaches its receiving position.

3. In an egg treating machine having an egg treating chamber and means for conducting trays of eggs thereto, the combination therewith of a reciprocating platform for dipping a tray of eggs in said chamber, latch means having means thereon for stopping the movement of an approaching tray of eggs on said conducting means adjacent to said chamber, means on the platform to retain said latch means elevated for primarily stopping said approaching tray when adjacent to the chamber, said latch means being adapted to drop by gravity as the platform descends, and means on said latch means for stopping said tray in a slightly advanced position for preventing its advance until the platform has reached its proper tray-receiving position.

4. In an egg treating machine having an egg treating chamber and means for conducting trays of eggs thereto, the combination therewith of a reciprocating platform for dipping a tray of eggs in said chamber, latch means having means thereon for primarily stopping the approaching tray of eggs on said conducting means adjacent said chamber, means on the platform to raise said tray, flange means on said latch means for stopping said approaching tray in a slightly advanced position until the platform has reached its upper tray receiving position, and a lifting-shoulder on said latch means for engaging and lifting said approaching tray as the platform moves to its receiving position and raises said flange means out of the path of said tray.

5. In an egg treating machine having a treating chamber and means for conducting trays of eggs successively thereto, also discharge means for conducting them therefrom, the combination therewith of a reciprocating member for dipping a tray of eggs in said chamber, means for releasably stopping the movement of a succeeding tray on the feeding means at a place adjacent to said chamber, means for releasably stopping the forward movement of the first tray while being positioned on said member, and means under the control of a movement of said member for automatically releasing both of said stopping means when the member reaches its uppermost position.

6. In an egg treating machine having a treating chamber and feeding means for conducting trays of eggs thereto, also discharge means for conducting them therefrom, the combination therewith of a reciprocating platform for dipping a tray of eggs in said chamber, means for limiting the movement of a succeeding tray on the feeding means adjacent said chamber, latch means adapted to limit the movement of the tray on the platform and to position it properly thereon and for raising the forward end of said tray on the platform as said platform arrives at its upper position, and means on the platform for automatically moving said two limiting means and enabling the tray on the platform and the succeeding tray to advance.

7. In an egg treating machine including a treating chamber and means for conducting thereto a tray of eggs with a filler thereon, the combination therewith of a carrier for receiving said tray of eggs and dipping it in said chamber, and means for automatically separating the filler from the tray to support it as the tray moves onto the carrier.

8. In an egg treating machine having a treating chamber and means for conducting a tray of eggs with a filler thereon, the combination therewith of a reciprocating platform for receiving and dipping a tray of eggs, means for supporting said filler above said chamber while the tray with eggs is being dipped, and means automatically actuated by the movement of said platform for lifting an approaching tray with the eggs and the filler, to facilitate the passage of the filler onto said supporting means as the tray moves onto the platform.

9. In an egg treating machine having a treating chamber and means for conducting a tray carrying eggs and a filler thereon, the combination therewith of a reciprocating platform for dipping trays of eggs, means for supporting said filler above said chamber while the eggs are being dipped, latch means for limiting the forward movement of the succeeding tray of eggs on said conducting means adjacent to said chamber, means on said platform for moving said latch means out of the path of travel of said succeeding tray, and means on said latch means for lifting said succeeding tray and its filler, by said moving of said latch, to facilitate the travel of the filler automatically onto said supporting means as the tray moves onto the platform.

10. In an egg treating machine having a chamber for treating eggs and feeding means for conducting trays of eggs with fillers to said chamber, the combination therewith of a platform for reciprocating a tray of eggs in said chamber, latch means for limiting the movement of a tray of eggs on the feeding means until the platform is in receiving position, stopping means for stopping and positioning a tray of eggs on said platform, supporting means for receiving a filler and supporting it above said chamber while the tray with the eggs is being treated, means on the platform for moving said latch means and said stop means out of the path of travel of said trays, means on said latch means for lifting the succeeding tray to facilitate the movement of the filler automatically onto said supporting means as the tray moves onto the platform, and means in the chamber for moving the tray of eggs laterally on the platform, whereby to enable said stop means to lift the discharge end of the tray as said platform reaches its upper position.

11. In an egg treating machine including a treating chamber and means for conducting thereto a tray of eggs with a filler thereon, the combination therewith of means for dipping the tray of eggs into the chamber, and means for separating the filler from the eggs before the same are dipped.

12. In an egg treating machine including a treating chamber, means for conducting a tray of eggs having a filler thereon into a position to be carried downwardly into the chamber, means for carrying the tray of eggs downward into the chamber, and means for separating the filler from the eggs in the tray before the tray of eggs is carried into the chamber.

13. In an egg treating machine including a treating chamber and means for conducting thereto a tray of eggs having a filler thereon and means for carrying the tray of eggs into and out of the chamber, the combination therewith of means for removing the filler from the eggs in the tray before the same are carried into the chamber and for reapplying the filler to the eggs in the tray after the same are carried out of the chamber.

14. In an egg treating machine having a treating chamber and means for carrying a tray of eggs in a path to, into and out of the treating chamber, the combination therewith of means for automatically removing a filler from such tray of eggs before the eggs enter the chamber and for automatically reapplying a filler to such tray of eggs after the tray has emerged from the chamber.

15. In an egg treating machine including a treating chamber and having means for reciprocating a tray of eggs therein, and means for conducting trays of eggs to and upon the reciprocating means, the combination therewith of means for stopping the movement of an approaching tray of eggs on said conducting means to maintain the tray of eggs off of said reciprocating means until the reciprocating means is in its tray-receiving position, means actuated by the movement of the reciprocating means for moving said stopping means to permit the tray to move upon the reciprocating means, catch means holding the reciprocating means releasably in elevated position while receiving the tray of eggs, and means under the influence of the tray of eggs on the reciprocating means for releasing said catch means.

16. In an egg treating machine including a treating chamber and having means for reciprocating a tray of eggs therein, and means for conducting trays of eggs to and upon the reciprocating means, the combination therewith of releasable catch means adapted to hold the reciprocating means in an elevated position to receive a tray of eggs thereon, said catch means being under the influence of a tray of eggs on the reciprocating means whereby the reciprocating means are released by the tray of eggs thereon for downward movement into the chamber, and means under the influence of the upward movement of the reciprocating means for moving the tray of eggs out of position to release said catch means whereby the reciprocating means may not descend and carry the tray of eggs a second time into the chamber.

17. In an egg treating machine including a treating chamber and a reciprocating carrier for dipping trays of eggs therein, the combination therewith of conveyor means for conducting trays of eggs to said chamber, said means slanting downwardly toward said chamber and providing a gravity conveyor mechanism for automatically conveying the trays of eggs by gravity to said chamber, movable stop means adjacent to said treating chamber for releasably holding the tray which is next-adjacent to said chamber from advancing until said reciprocating carrier is in position normally to receive it, and means synchronized with a movement of said carrier for moving said stop means to release such tray for advancement upon the carrier.

18. In an egg treating machine including a treating chamber and a reciprocating carrier for dipping trays of eggs therein, the combination therewith of a feeding conveyor for conducting trays of eggs to the chamber and a discharge conveyor for conducting trays of eggs therefrom, said feeding conveyor declining toward the chamber and the discharge conveyor declining away from the chamber for conveying the trays of eggs automatically by gravity thereover, and means adjacent to said chamber and carrier and including a part actuated in synchronism with a movement of the carrier, for periodically stopping the trays of eggs and admitting them singly from the feeding conveyor onto the carrier to be dipped, said discharge conveyor being arranged to receive from the conveyor a dipped tray simultaneously with the movement upon the conveyor of a tray to be dipped.

WILLIS G. HOWARD.